(12) United States Patent
Webber et al.

(10) Patent No.: US 6,780,804 B2
(45) Date of Patent: Aug. 24, 2004

(54) EXTENDED PARTICLE SIZE DISTRIBUTION CERAMIC FRACTURING PROPPANT

(75) Inventors: Roy A. Webber, Fort Smith, AR (US); Danny L. Mickelson, Alma, AR (US); Stephen K. Schubarth, Sugarland, TX (US); Edwyn M. Snyder, Fort Smith, AR (US); Andrew T. Sheppard, Van Buren, AR (US)

(73) Assignee: Saint-Gobain Ceramics & Plastics, Inc., Stow, OH (US)

( * ) Notice: Subject to any disclaimer, the term of this patent is extended or adjusted under 35 U.S.C. 154(b) by 0 days.

(21) Appl. No.: 10/350,881

(22) Filed: Jan. 24, 2003

(65) Prior Publication Data

US 2004/0147388 A1 Jul. 29, 2004

(51) Int. Cl.⁷ .......................... C04B 35/10; E21B 43/267
(52) U.S. Cl. ...................... 501/128; 501/141; 501/149; 166/280.2; 507/924
(58) Field of Search .......................... 501/128, 141–150; 166/280.2; 507/924

(56) References Cited

U.S. PATENT DOCUMENTS

| | | | |
|---|---|---|---|
| 4,068,718 A | 1/1978 | Cooke, Jr. et al. | |
| 4,462,466 A | 7/1984 | Kachnik | |
| 4,522,731 A | 6/1985 | Lunghofer | |
| 4,547,468 A | 10/1985 | Jones et al. | |
| 4,555,493 A | 11/1985 | Watson et al. | |
| 4,623,630 A | 11/1986 | Fitzgibbon | |
| 4,632,876 A | 12/1986 | Laird et al. | |
| 4,668,645 A | * 5/1987 | Khaund ....................... | 501/127 |
| 4,680,230 A | 7/1987 | Gibb et al. | |
| 4,713,203 A | 12/1987 | Andrews | |
| 4,894,285 A | * 1/1990 | Fitzgibbob .................. | 428/402 |
| 4,921,820 A | 5/1990 | Rumpf et al. | |
| 4,921,821 A | 5/1990 | Rumpf et al. | |
| 4,944,905 A | 7/1990 | Gibb et al. | |
| 4,977,116 A | 12/1990 | Rumpf et al. | |
| 5,030,603 A | 7/1991 | Rumpf et al. | |
| 5,120,455 A | 6/1992 | Lunghofer | |
| 5,188,175 A | 2/1993 | Sweet | |
| RE34,371 E | 9/1993 | Rumpf et al. | |
| 5,330,005 A | 7/1994 | Card et al. | |
| 6,257,335 B1 | 7/2001 | Nguyen et al. | |
| 6,372,678 B1 | 4/2002 | Youngman et al. | |
| 6,488,091 B1 | 12/2002 | Weaver et al. | |

OTHER PUBLICATIONS

"Recommended Practices for Testing High Strength Proppants Used in Hydraulic Fracturing Operations", by American Petroleum Institute, First Edition, Feb. 1, 1989.

"Petroleum and Natural Gas Industries—Completion Fluids and Materials—Part 2: Procedure for Measuring Properties of Proppants Used in Hydraulic Fracturing and Gravel Packing Operations", ISO, 2001, no month.

* cited by examiner

*Primary Examiner*—Karl Group
(74) *Attorney, Agent, or Firm*—Fay, Sharpe, Fagan, Minnich & McKee, LLP (57) ABSTRACT

A proppant mixture with an extended particle size distribution exhibits improved properties, such as crush strength and conductivity, as compared with a conventional product with a narrow size distribution.

24 Claims, 3 Drawing Sheets

EXTENDED PARTICLE SIZE DISTRIBUTION CERAMIC FRACTURING PROPPANT

BACKGROUND OF THE INVENTION

1. Field of the Invention

The invention relates to proppants useful in oil and gas wells. In particular, it relates to a ceramic proppant material in which proppants of various sizes are included, and will be described with particular reference thereto. It will be appreciated, however, that the invention is also suited to the extraction of other fluids from boreholes, such as water wells.

2. Discussion of the Art

Oil and natural gas are produced from wells having porous and permeable subterranean formations. The porosity of the formation permits the formation to store oil and gas, and the permeability of the formation permits the oil or gas fluid to move through the formation. Sometimes the permeability of the formation holding the gas or oil is insufficient for economic recovery of oil and gas. In other cases, during operation of the well, the permeability of the formation drops to such an extent that further recovery becomes uneconomical. In such circumstances, it is common to fracture the formation and prop the fracture in an open condition by means of a proppant material or propping agent Such fracturing is usually accomplished by hydraulic pressure using a gel-like fluid. The pressure is increased until cracks form in the underground rock. The proppants, which are suspended in this pressurized fluid, are forced into the cracks or fissures. When the hydraulic pressure is reduced, the proppant material functions to prevent the formed fractures from closing again.

A wide variety of proppant materials are used, depending on the geological conditions. Typically, proppants are particulate materials, such as sand, glass beads, or ceramic pellets, which create a porous structure. The oil or gas is able to flow through the interstices between the particles to collection regions, from which it is pumped to the surface. Over time, the pressure of the surrounding rock tends to crush the proppants. The resulting fines from this disintegration tend to migrate and plug the interstitial flow passages in the propped structure. These migratory fines drastically reduce the permeability, lowering the conductivity of the oil or gas. Conductivity is a measure of the ease with which oil or gas can flow through the proppant structure and is important to the productivity of a well. When the conductivity drops below a certain level, the fracturing process is repeated or the well is abandoned.

Ceramic proppants, sometimes called man-made proppants, are favored over natural proppants, such as sand or resin-coated sand, due to their ability to withstand high pressures and temperatures and their resistance to corrosion. Despite being of higher cost than natural materials, the increased crush strength of ceramic renders the ceramic proppants suitable for conditions which are too severe for other materials, e.g., at rock pressures of above about 350 to 700 kg/cm$^2$ (5000–10,000 psi). As pressure increases with depth, ceramic proppants are commonly used at depths of about 1500 meters, or more. They are typically formed by combining finely ground material, such as clay, bauxite, or alumina, with water and then mixing in a rotary mixer. Blades in the mixer cause the wet clay to ball up into generally spherical pellets, which upon drying and firing at high temperature are of the general particle size desired. Pellets which fall outside the desired range are returned to the mixer after the drying stage to be reworked.

The crush strength of the proppants is related to the composition and density of the ceramic. Proppants are generally classed in one of three grades: light weight proppants (LWP), intermediate grade proppants (IP), and high strength proppants (HSP). Light weight proppants are suitable for use over a range of closure stress from less than about 1000 psi to about 8000 psi, while intermediate grade proppants are useful up to about 10,000 psi, and high strength proppants can be used at pressures in excess of 12,000 psi. Attempts to improve conductivity have focused on methods of improving crush strength of the proppants. These include the application of coatings, production of stronger spheres, and changes in shape. While measurable improvements in conductivity have been obtained, for example, by applying a resin coating, such improvements have invariably been associated with increases in cost.

Spherical pellets of uniform size have conventionally been considered to be the most effective proppants as they have been thought to maximize conductivity (see, e.g., U.S. Pat. No. 4,623,620). An excess of fines (very small pellets) acts to clog the void space in between the packed spheres, reducing the fluid transport. It is also known that spheres tend to be weaker as the size increases, and are thus more likely to become crushed in situ. In addition to increases in the number of fines, crushing results in a reduction in the width of the crack formed in the fracturing process. Thus, the presence of both small and large particles in a proppant mixture has been thought to be deleterious. Accordingly, the American Petroleum Industry (API) standard, the commonly accepted standard in the industry, requires that the particle size distribution be within fairly narrowly defined limits. For example, particle size ranges are defined according to mesh size designations, such as 40/70, 30/50, 20/40, 16/30, 16/20, and 12/18. The first number in the designation refers to the ASTM U.S. Standard mesh size of the largest (top) sieve and the second number refers to the mesh size of the smallest (bottom) sieve. The API standards require that 90% of the spheres comprising the proppant material be retained between the top and bottom sieve when sieved through the mesh designations for the product.

As a result of the requirements for narrow particle size distributions, only a small proportion of the pellets produced in the forming process are within the predetermined range. The remainder, often as much as 75–80% of the material, must be reground or otherwise treated and reformed in the rotary mixer.

The present invention provides a new and improved proppant material and method of making and use which overcome the above-referenced problems and others.

SUMMARY OF THE INVENTION

In accordance with one aspect of the present invention, a method of forming a proppant mixture is provided. The method includes combining a particulate material with a liquid to form a mixture. The mixture is formed into spherical pellets. The pellets are screened and fired to provide a proppant mixture with a size distribution in which: 0–25% wt. % of the total weight of pellets have a diameter of from 1.0–1.18 mm; 20–38 wt. % of the particles have a diameter of from 0.85–1.0 mm; 20–38 wt. % of the pellets have a diameter of from 0.71–0.85 mm; and 15–35 wt. % of the pellets have a diameter of from 0.60–0.71 mm.

In accordance with another aspect of the present invention, a method of forming a proppant mixture is provided. The method includes combining a particulate material with a liquid to form a mixture, forming the mixture into spherical pellets, screening and firing the pellets to provide a proppant mixture comprising pellets having a median diameter of from about 0.6 to 0.85 mm and wherein when the proppant mixture is sieved through a plurality of sieves having ASTM U.S. Standard mesh sizes of 18, 20, 25, 30, and 35: 20–38 wt. % of the pellets are retained by the 20 mesh sieve, 20–38 wt. % of the pellets are retained by the 25 mesh sieve, and 15–35 wt. % of the pellets are retained by the 30 mesh sieve.

In accordance with another aspect of the present invention, a method of forming a proppant mixture is provided. The method includes combining a particulate material with a liquid to form a mixture, forming the mixture into spherical pellets, and screening and firing the pellets to provide a proppant mixture comprising pellets with a size distribution in which: at least 3 wt. % of the pellets have a diameter of from 1 mm–1.18 mm, at least 20 wt. % of the pellets have a diameter of from 0.85–1.0 mm, less than 33 wt. % of the pellets have a diameter of from 0.71–0.85 mm, and at least 10 wt. % of the pellets have a diameter of from 0.60–0.71 mm.

In accordance with another aspect of the present invention, a proppant mixture is provided. The proppant mixture includes ceramic pellets having a sphericity of at least 0.75. At least 3 wt. % of the pellets have a diameter of from 1 mm–1.18 mm, at least 20 wt. % of the pellets have a diameter of from 0.85–1.0 mm, less than 38 wt. % of the pellets have a diameter of from 0.71–0.85 mm, and at least 10 wt. % of the pellets have a diameter of from 0.60–0.71 mm.

In accordance with another aspect of the present invention, a method of propping a geological formation is provided. The method includes combining spherical pellets with a liquid or gel to form a mixture and forcing the mixture under pressure into the geological formation until the pellets are situated in cracks in the formation, the spherical pellets having a size distribution in which: at least 3 wt. % of the pellets have a diameter of from 1 mm–1.18 mm, at least 20 wt. % of the pellets have a diameter of from 0.85–1.0 mm, less than 38 wt. % of the pellets have a diameter of from 0.71–0.85 mm and at least 10 wt. % of the pellets have a diameter of from 0.60–0.71 mm.

In accordance with another aspect of the present invention, a proppant mixture is provided. The mixture comprises ceramic pellets having a median particle size. When the proppant mixture is sieved through a sequential series of mesh sizes selected from the ASTM U.S. Standard mesh sizes consisting of 12, 14, 16, 18, 20, 25, 30, 35, 40, and 45, the median particle size is in a peak mesh size corresponding to one of the meshes in the series. 0–25% wt. % of the pellets are retained on the sieve having a mesh size which is two sizes preceding the peak mesh in the sequence, 20–38 wt. % of the particles are retained on the sieve having a mesh size immediately preceding the peak mesh in the sequence, 20–38 wt. % of the pellets are retained on the peak mesh, and 15–35 wt. % of the pellets are retained on the next subsequent mesh in the sequence.

An advantage of at least one embodiment of the present invention is that conductivity through a proppant structure is increased.

Another advantage of at least one embodiment of the present invention is that the strength of the proppant mixture is higher, under pressure, than would be conventionally expected from the distribution range.

Another advantage of at least one embodiment of the present invention is that a smaller portion of the green proppant pellets are recycled.

Another advantage of at least one embodiment of the present invention is that the product can be produced at a cost comparable with light weight proppants, but with higher crush resistance and conductivity under pressure.

Another advantage of the present invention is that a user of proppants can replace both IP grade and LWP grade proppants with an Extended PSD intermediate grade proppant mixture, or HSP, IP, and LWP grades with an Extended PSD high strength grade, thus reducing the amount of inventory the user holds.

Another advantage of the present invention is that an increase in conductivity enables increased productivity from a geological formation due to increases in fracture half-lengths. Fracture half-length is a measure of the length of the fracture in a geological feature.

Still further advantages of the present invention will be readily apparent to those skilled in the art, upon a reading of the following disclosure and a review of the accompanying drawings.

"Spherical" and related forms, as used herein, is intended to mean an average ratio of minimum diameter to maximum diameter of about 0.75 or greater, or having an average sphericity value of about 0.75 or greater compared to a Krumbein and Sloss chart.

"Specific gravity" is the weight in grams per cubic centimeter (g/cc) of volume, excluding open porosity in determining the volume. The specific gravity value may be determined by liquid (e.g., water or alcohol) displacement or with an air pycnometer.

"Calcined" as used herein, refers to a heating process to which a material has been subjected. Ore materials that have been fully subjected to calcination or a calcining process exhibit very low loss on ignition (LOI) and moisture contents, e.g., about 1–2 percent by weight or less. Uncalcined ore materials such as bauxites and clays can contain from about 10 to about 40 percent by weight volatiles. "Partially calcined" materials typically exhibit total volatiles (LOI plus moisture content) of 5 to 8 percent by weight. Volatiles can include moisture, organics and chemically held water (e.g., water of hydration). Typical calcination temperatures are usually less than 1000° C.

"Sintering" as used herein refers to a heating process in which the materials are at least partially converted to another form by heating the material to a temperature above that at which such conversion occurs. For bauxites, clays, and the like, conversion typically begins at around 1150° C.

DETAILED DESCRIPTION OF THE PREFERRED EMBODIMENT

A proppant mixture, containing both fine and coarse materials in the form of generally spherical beads or pellets, within certain size distribution ranges, has been unexpectedly found to provide improvements in conductivity as compared with comparable materials having a conventional particle size distribution. In a preferred embodiment, the pellets comprise a ceramic material, such as an aluminosilicate, preferably one in which the particle size distribution is selected to provide both small and large particles in the mixture.

The proppant mixture, which will be referred to herein as an extended particle size distribution (extended PSD) mixture may be formed to have approximately the same median particle size as a conventional proppant mixture, but with a wider size distribution curve, while closely controlling the proportions of fines and large particles for the particular grade. Particle size, as used herein, is expressed in terms of particle diameter, and assumes the particles to be completely spherical. Thus, in the case of a conventional 20/40 intermediate grade proppant mixture, the median particle size may be from about 0.65 mm to about 0.73 mm, with the majority of the particles (at least 90%, and typically about 95% by weight or greater) having a mesh size in the range of −20 to +40 (i.e., the 25, 30, 35, and 40 mesh fractions), as shown in TABLE 1, thus meeting the API standards.

By way of comparison, an extended PSD according to the present invention may have a similar median particle size of 0.60 mm to about 0.85 mm, more preferably, about 0.70 mm to about 0.78 mm and is useful as a replacement for a conventional 20/40 proppant mixture of the same grade or a lower grade. However, the extended PSD material has greater than 10% of its material falling outside the range for a 20/40 product, and thus does not meet the API standard. Preferably less than about 80%, more preferably, less than 70%, and most preferably, only about 64–67% of the particles are in the −20 to +40 mesh range, as shown in TABLE 1, below (All mesh sizes are ASTM U.S. Standard mesh sizes, unless otherwise noted). Additionally, the proportions of small and large particles are preferably controlled. The amount of +16 mesh beads (i.e., the wt. % of the total weight of beads which are trapped by a 16 mesh sieve or larger) is preferably about 10% by wt., or less, of the total weight of the mixture, more preferably, less than 5%, yet more preferably, less than 1%, and most preferably, no more than about 0.6%. The amount of +18 mesh beads (i.e., the wt. % of the total weight of beads which are trapped by an 18 mesh sieve or larger) is preferably about 10% by wt., or less, of the total weight of the mixture, more preferably, less than 8%, and most preferably, no more than about 6% (illustrated in TABLE 1 as the sum of the 18 and 16 mesh fractions). The amount of −35 mesh beads (i.e., wt percent of the total weight of beads which pass through a 35 mesh sieve) is preferably about 10% by wt., or less, of the total weight of the mixture, more preferably, about 5–8%. The amount of −40 mesh beads (i.e., beads which pass through a 40 mesh sieve) is preferably 2% by wt., or less, of the total weight of the mixture, more preferably, about 1% by wt. (1.1 wt. % in the Example shown in TABLE 1). The amount of −45 mesh beads (i.e., beads which pass through a 45 mesh sieve) is preferably 1% by wt., or less, of the total weight of the mixture, more preferably, about 0.5% by wt., or less (about 0.2 wt. % in the Example shown in TABLE 1). To achieve each or most of these constraints, the standard deviation in particle size of the extended PSD is substantially greater than is the case in the conventional 20/40 product, i.e., the shape of the curve resulting when mesh size is plotted against % retained is relatively broad in the middle.

Preferably, for a 20/40 size replacement proppant mixture, the median particle diameter is from 0.6 mm to 0.85 mm, more preferably, about 0.70 to 0.78 mm, most preferably, about 0.72 to 0.75 mm, and the specific gravity is from about 2.1 to 2.9 g/cc for a LWP, about 3.0 to 3.5 g/cc for an IP, and about 3.3 to 4.2 g/cc for a HSP (all specific gravity values discussed herein were determined by water displacement, unless otherwise noted). The particle size distribution can be determined by screening the proppant mixture through a series of sieves, of successively smaller sieve size (i.e., larger ASTM U.S. Standard mesh number). For example, the proppant mixture is screened through the following ASTM U.S. Standard mesh sieves: 16, 18, 20, 25, 30, 35, 40, 45, 50, according to the American Petroleum Institute (API) Recommended Practice 60 (RP 60), Section 7, p. 11, dated Feb. 1, 1989 (the API RP 60 test uses only six sieves, but additional sieves may be used, as here, to obtain a more accurate distribution of particle size).

For the 20/40 replacement proppant mixture, the percentage retained on the 18 mesh sieve (i.e., the wt. % of particles having a diameter of from 1 mm–1.18 mm) is preferably from 0–25%, more preferably, from 3–10%, most preferably, at least 5 wt %. The percentage retained on the 20 mesh sieve (i.e., the wt. % of particles having a diameter of from 0.85–1.0 mm) is preferably from 20–38 wt. %, more preferably, from 22–30%. The percentage retained on the 25 mesh sieve (i.e., the wt. % of particles having a diameter of from 0.71–0.85 mm) is preferably from 20–38 wt. %, more preferably, from 25–36 wt. %. The percentage retained on the 30 mesh sieve (i e., the wt. % of particles having a diameter of from 0.60–0.71 mm) is preferably from 15–35 wt. %, more preferably, from 16–30 wt. %. The percentage retained on the 35 mesh sieve (i.e., the wt. % of particles having a diameter of from 0.50–0.60 mm) is generally from 1–25 wt. %, more typically, 5–20%, most typically, from 6 to 15 wt. %. The percentage retained on the 40 mesh sieve (i.e., the wt. % of particles having a diameter of from 0.425–0.50 mm) is generally greater than 1%, typically, greater than 4 wt. %, more typically, 5–10 wt. %. Of these parameters, the particle sizes of the sieves closest to the median particle size, i.e., the sieve sizes overlapping and adjacent to the median particle size, are generally the most important (the 20, 25, and 30 mesh fractions in the Example of TABLE 1, where the median particle size is about 0.73 mm). Preferably, a total of less than 70 wt. % of the pellets is retained by the 25, 30, and 35 mesh sieves, more preferably, less than 65%, and most preferably, about 60% by wt. Preferably, at least 90% by weight of the pellets have a diameter of from 0.50 mm to 1.18 mm, more preferably, at least 95% by wt.

By targeting the median particle size close to that of a conventional 20/40 ceramic proppant product, the Extended PSD has similar flow characteristics during introduction to the well. If the median particle diameter is substantially different to that of the conventional product which it is to replace (20/40 in the illustrated embodiment), it tends to have different pumping characteristics.

Expressed in terms of mesh size and particle size, one suitable Extended PSD as a replacement for a 20/40 product has the attributes noted in TABLE 1.

TABLE 1

| ASTM U.S. Standard Sieve Mesh Size | Equivalent Particle Diameter | Weight % Retained | |
|---|---|---|---|
| | | Typical 20/40 Intermediate Grade | Exemplary Extended PSD |
| 16 | >1.18 mm | 0.0 | 0.5 |
| 18 | 1–1.18 mm | 0.0 | 5.4 |
| 20 | 0.85–1.0 mm | 2.0 | 27.1 |
| 25 | 0.71–0.85 mm | 38.0 | 26.1 |
| 30 | 0.60–0.71 mm | 33.0 | 20.8 |
| 35 | 0.50–0.60 mm | 24.0 | 13.5 |
| 40 | 0.425–0.5 mm | 3.0 | 6.0 |
| 45 | 0.355–0.425 | 0.0 | 0.9 |
| 50 | 0.30–0.355 | 0.0 | 0.2 |

The equivalent particle diameter is based on the mesh sizes, assuming that the particles are spherical.

Suitable starting materials for forming the proppants include those containing oxides, such as aluminum oxides, such as alumina, silicon oxides, such as silica, and mixtures thereof. Generally, the oxides of silica and alumina comprise at least 80% by weight of the starting materials, expressed in terms of the calcined (substantially anhydrous) weight, more preferably, about 90%, or greater of the calcined weight Exemplary starting materials include clays (which are predominantly hydrated alumina), such as kaolin, diaspore clay, burley clay, and flint clay, bauxitic clays, natural or synthetic bauxites, mixtures thereof, and the like. The starting materials may be uncalcined or partly calcined. The sintered proppant mixture formed from such starting materials is preferably in the form of oxides, silicates, and aluminates which make up at least 50%, by weight, more preferably, at least 80%, and most preferably, at least 90% by weight of the sintered proppant material.

Various sintering aids, such as bentonite clay, iron oxide, boron, boron carbide, aluminum diboride, boron nitride, boron phosphide, other boron compounds, or fluxes, such as sodium carbonate, lithium carbonate, feldspar, manganese oxide, titania, iron oxide, and sodium silicates may be added in amounts of up to about ten (10) weight percent to aid sintering. If desired, a binder for example, a starch, resin or wax, such as gelatinized cornstarch, calcium carbonate, polyvinyl alcohol, or combination thereof, may be added to the initial mixture to improve pelletizing and to increase the green strength of the unsintered pellets. Generally the binder is added at about 0–6% by weight, based on the weight of oxides.

The starting materials are preferably ground, for example, by ball milling or other attrition process, to form particles having a mean size of about 20 microns or less, more preferably about 15 microns, or less, most preferably, about 10 microns, or less, expressed in terms of the particle diameter (or average diameter, where the particles are non-spherical). Prior to grinding, the starting materials may be dried to improve the ease of grinding.

In a preferred method, the ground starting materials are combined with a liquid, such as water, and mixed in an intensive mixer having a rotatable containment vessel provided with a rotor table and a rotatable impacting impeller, such as an Eirich mixer. The rotor table, or pan, rotates in an opposite direction to the impacting impeller. The impacting impeller may be in the form of a disk with rods or bars attached to the disk and aligned generally parallel with the axis of rotation of the impeller. Sufficient water is added to cause essentially spherical pellets of the mixture to form (generally, about 15–40 wt. % water based on the weight of starting materials). After such pellets have formed, from about 0–25%, more typically, 5 to about 15 percent of additional ceramic powder (preferably, the same dry starting material as is used to form the wet mixture) by weight of pellets is added, and the mixer is further operated to cause accretion of the added material to the pellets being formed.

Although an intensive mixer is one way of producing pellets, other forming methods are also contemplated. For example, a slurry of the starting materials in water may be sprayed to form the pellets.

The resulting pellets are then dried to a moisture content of less than about 10 weight percent, usually in a drier at between about 100° C. and about 300° C. The "green proppants" thus formed are thereafter sintered in a furnace at sintering temperature until a specific gravity between about 2.1 and 4.2 g/cc is obtained, depending on the composition of the sintering mixture, and the desired specific gravity of the proppants. For a LWP, the specific gravity after sintering is preferably from about 2.1 to 2.9 g/cc, about 3.0 to 3.5 g/cc for an IP, and about 3.3 to 4.2 g/cc for a HSP. Sintering generally causes a reduction of up to about 20% in pellet size as well as an increase in specific gravity in the component products. Suitable sintering temperatures are generally about 1200° C. and above, more preferably, above about 1300° C., most preferably, about 1500° C.

The pellets are screened for size, preferably after drying. An initial screening of the green proppants is carried out after drying, but prior to sintering. For example, a top screen having a mesh size of about 14 or 16 mesh is used to screen out the largest particles and a bottom screen having a mesh size of about 28, 30, or 32 is used to remove the finer particles (note that these screens do not follow exactly the ASTM U.S. Standard mesh size designations). The choice of top and bottom screens depends, in part on the mixture produced by the mixer and can be adjusted to tailor the median particle size of the mixture. The rejected oversized and undersized pellets may be recycled. A further screening may take place after sintering.

The finished proppants are spherical (i.e., have an average sphericity value of about 0.75 or greater, more preferably, at least 0.80, and typically, 0.80–0.9). The particle size of the fired and screened proppant pellets is generally between 0.1 and about 2.5 millimeters. The screen sizes are selected to provide a proppant mixture with the desired particle size distribution, as discussed above.

The conductivity of a pack of the thus-formed proppant mixture may be tested according to Stim-Lab's standard test procedure. For an Extended PDS intended as a 20/40 replacement, the procedure is as follows. A 75 ton Dake Press is used with API Monel K-500 flow cells with 10 sq in. flow paths. Two 10 sq in. Ohio Sandstone blocks are used as core slabs. An API cell is loaded with a proppant sample to be tested and leveled with a blade device. The proppant sample is placed between the core slabs and made a part of a four-cell stack. The cells are positioned between the platens of the Dake Press. Pressure is increased to 500 psi and the system evacuated and saturated with water at 70–75° F. Once saturated, the closure pressure is increased to 1,000 psi, at a rate of 100 psi/min. The proppant is allowed to equilibrate. The flow rate, pressure differential, and average width are measured at each pressure in order to calculate conductivity. Five measurements are taken and averaged to arrive at each conductivity. Flow rate is measured with a Mettler balance to 0.01 ml/min. Darcy's Law is used for the calculations to determine the conductivity. The test temperature is then increased to 250° F. and allowed to equilibrate for 12 hours prior to increasing the closure pressure. The conductivity of the proppant is determined at 1,000 psi, at room temperature, and at 1,000 psi at 250° F.

The pressure is then increased at 100 psi per minute, at 1,000-psi increments and the above measuring technique repeated. The conductivity of the proppant is continuously monitored for 50 hours at 250° F. at a pressure of 2,000 psi, 4,000 psi, 6,000 psi, 8,000 psi, or at 10,000 psi, or higher.

The conductivity, as determined by this method, is preferably at least 8000 md-ft at 2000 psi, at least 4500 md-ft at 6000 psi, and at least 3000 md-ft at 8000 psi, for an intermediate grade ceramic which is fired at a temperature of at least 1300° C., more preferably, about 1500° C.

The higher conductivity enables increased productivity from a geological formation due to increases in fracture half-lengths.

Crush strength may be measured according to the American Petroleum Institute Recommended Practice 60 (RP 60), Section 7, pp. 14–16, dated Feb. 1, 1989, except as noted herein. Specifically, a portion of the proppant mixture is sieved through 18 and 40 mesh size sieves (for a 20/40 proppant mix replacement). The proppant material retained on the lower (40 mesh) sieve only is used for the test. A known weight of the screened mixture is placed in a test cell with a piston (FIG. 7.1 of RP 60) and the cell placed in a press. The mixture is generally subjected to one of five different stress levels (5000, 7500, 10,000, 12,5000, and 15,000 psi) for two minutes. The mixture is then sieved again using the two sieves and the fines collected in a pan below the finer sieve are weighed. The crush strength (at the particular stress level) is expressed in terms of wt. % fines, i.e., $$\text{crush strength} = \frac{[\text{weight of fines}]}{[\text{weight of proppant sample placed in the cell}]} \times 100$$

The crush strength as determined by this method is preferably less than 3%, more preferably, less than 2%, and most preferably, about 1.5%, or less, for a proppant pack of the intermediate grade Extended PSD, when tested at 7500 psi, which is significantly less than for a comparable LWP grade 20/40 proppant mixture having approximately the same median particle diameter and at least comparable, over most of the pressure range, to a IP grade formed from similar materials. It will be appreciated that for high strength proppants, such as those formed from sintered bauxite, crush strengths for an Extended PSD mixture are respectively better.

Unexpectedly, it has been found that the additional fine pellets, in excess of the amount typically contained in a conventional 20/40 product, do not reduce the conductivity of the product by clogging the void spaces created by the medium and large-sized pellets. Additionally, it has been found that the oversized pellets, which are inherently weaker, that are present in the mixture, do not appear to crush prematurely and worsen the conductivity. Both of these findings are contrary to the conventional expectations and reasoning for producing a narrow size distribution proppant. These findings are also true for other Extended PSD products, such as 16/20 and 16/30 replacements, as will be discussed in further detail below.

Although not fully understood, it is believed that the positive benefits on the conductivity result from the natural particle packing characteristics of the unique distribution. It is suggested that, rather than the fine particles isolating themselves and falling into and clogging the void spaces, the smaller particles distribute themselves around the larger spheres, acting as bridges between the larger spheres. Therefore, they are not free to clog the voids and may actually increase the void space because of the separations caused between the larger spheres. The result is the much improved conductivity at low applied stress apparent from the conductivity curves. Furthermore, this bridged particle structure results in a stronger proppant pack. It withstands breakdown and collapse at a given closure stress value than would be expected. It is suggested that the multi-particle bridges formed around the larger beads act as stress reducers as compared with the smaller number of high stress point contacts formed when the larger beads are in direct contact with each other.

While the Extended PSD proppants of the present invention have been described in terms of spherical sintered ceramic pellets, it is also contemplated that other rigid materials may be used to form the proppants, including plastics, resin-coated materials, and the like. The material selected for the proppants should be suited to use under the pressures and at the depth at which the formation is to be propped and be generally resistant to chemical attack by the fluid.

While the foregoing has discussed the formulation of an Extended PSD suited to replacement of a conventional 20/40 mix, similar principles can be applied for preparing a replacement for other conventional mixtures, such as 16/20 and 16/30 mixtures. The mixture can be defined by taking a sequential set of ASTM U.S. Standard mesh sizes from the following: 12, 14, 16, 18, 20, 25, 30, 35, 40, 50. The mesh size which retains a range of particles which encompasses the median particle size of the conventional product, and also its replacement, is defined as the peak mesh. The two sequentially adjacent meshes (i.e., above and below) are defined as the first upper and first lower meshes, respectively. The next mesh sizes are the second upper and second lower and so forth. The preferred and more preferred amounts by weight retained on the peak mesh, first upper, second upper, first lower, second lower mesh, etc are preferably the same for each distribution. Thus, in the case of a 16/30 Extended PSD replacement, which has a median particle size of 1.22 mm the meshes are as shown in TABLE 2.

TABLE 2

| | ASTM U.S. Standard Mesh Size | | | | | | |
|---|---|---|---|---|---|---|---|
| | 14 | 16 | 18 | 20 | 25 | 30 | 35, or less |
| For a 16/30 replacement | 2nd Upper Mesh | 1st Upper mesh | Peak Mesh | 1st Lower mesh | 2nd Lower Mesh | 3rd Lower mesh | 4th Lower Mesh |

TABLE 2-continued

|  | ASTM U.S. Standard Mesh Size | | | | | | |
| --- | --- | --- | --- | --- | --- | --- | --- |
|  | 14 | 16 | 18 | 20 | 25 | 30 | 35, or less |
| Preferred wt % retained | 0–25 | 20–38 | 20–38 | 15–35 | 1–25 | <10 | <3 |
| More Preferred wt % retained | 3–10 | 22–30 | 25–36 | 16–30 | 10–15 | <8 | ≦1 |
| Example Formulation, wt % | 5 | 27 | 26 | 20 | 13 | 6 | 0.5 |

Preferably, a total of less than 70%, more preferably, less than 65%, and most preferably, about 60% of the material in the mixture is retained on the peak mesh, first lower mesh, and second lower mesh. Additionally, preferably 0–25% wt. % of the pellets are retained on the second upper mesh, 20–38 wt. % of the particles are retained on the first upper mesh, 20–38 wt. % of the pellets are retained on the peak mesh, and 15–35 wt. % of the pellets are retained on the first lower mesh. Preferably, no more than 80% of the pellets are retained between the two sieves of the designation that the Extended PSD is intended to replace (i.e., between the 16 mesh and 30 mesh sieves in an Extended PSD intended as a 16/30 replacement. Further, preferably less than 75% of the pellets fall within the peak mesh size and the subsequent two mesh sizes in the sequence (i.e., in the case of the 16/30 replacement-are retained on the 18, 20, and 25 meshes).

The Extended PSD proppants of the present invention are used in the conventional manner to prop open a crack or fissure in a geological formation and thereby increase conductivity of the oil, gas, or other fluid desired to be extracted from the formation. Typically, a hollow casing is inserted into a drilled well. A mixture of the Extended PSD proppants and a gel or liquid is introduced into the casing at an inlet and forced at high pressure (typically 12,000–20,000 psi), into the geological formation through a casing outlet or outlets. The pack of proppants prop open the cracks thus created. The gel may be any fluid which has a sufficient viscosity to retain the proppants in suspension.

Without intending to limit the scope of the invention, the following examples demonstrate the improved properties of extended PSD proppants produced by the method described above.

EXAMPLES

Example 1

An intermediate grade Extended PSD (Extended PSD-1) is prepared as follows. The starting material (Arkansas bauxite) that had been previously ground to an average particle size of about 10 microns is added to an Eirich mixer along with water and a binder in sufficient amounts to fill the chamber of the mixer approximately two thirds full. Rotation of the table and impeller is continued until seed pellets of a suitable size are formed. A further amount of the initial bauxite material is added. Rotation of the table and impeller is then continued for a few minutes to form spherical pellets.

The pellets are then dried in a dryer to reduce the moisture content to about 10% and then fired at about 1500° C. for sufficient time to sinter them and achieve the desired density. Prior to firing, they are screened to produce a size distribution, which on firing yields a desired size distribution. Further screening is carried out after firing. The resulting pellets have a sphericity of about 0.8–0.9, as determined using the Krumbein and Sloss chart. These pellets are identified as Extended PSD-1 in TABLE 3 (compared once again with a conventional 20/40 mixture). The equivalent particle diameter is also shown.

TABLE 3

|  |  | Weight % Retained | |
| --- | --- | --- | --- |
| ASTM U.S. Standard Mesh Size | Equivalent Particle Diameter | Typical 20/40 Intermediate Grade | Extended PSD-1 |
| 16 | >1.18 mm | 0.0 | 0.5 |
| 18 | 1–1.18 mm | 0.0 | 6.0 |
| 20 | 0.85–1.0 mm | 2.0 | 27.9 |
| 25 | 0.71–0.85 mm | 38.0 | 24.7 |
| 30 | 0.6–0.71 mm | 33.0 | 21.8 |
| 35 | 0.50–0.60 mm | 24.0 | 12.8 |
| 40 | 0.425–0.5 mm | 3.0 | 6.0 |
| 45 | 0.355–0.425 | 0.0 | 0.5 |
| 50 | 0.30–0.355 | 0.0 | 0.01 |

Figure 1:
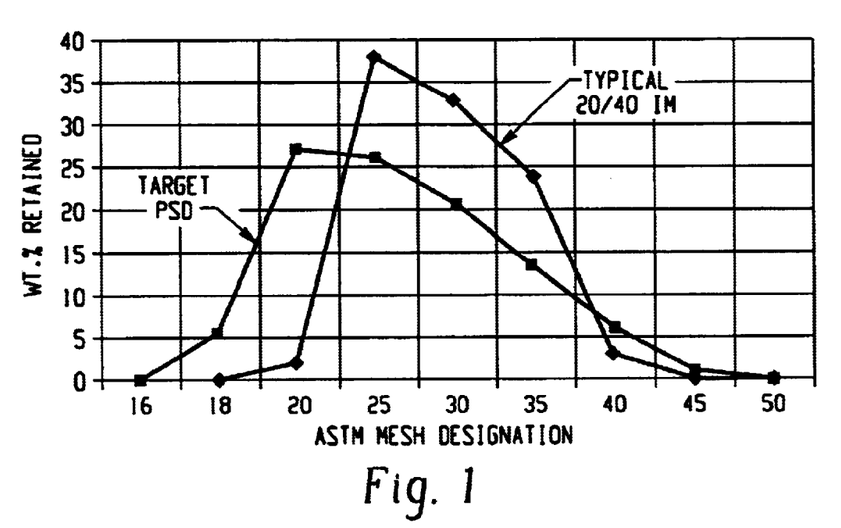
FIG. 1 is a plot of wt. % of proppant mixture retained as a function of ASTM U.S. Standard mesh designation for a first Extended PSD proppant mixture and a conventional 20/40 mixture.

These results are illustrated graphically in FIG. 1, which shows wt. % retained as a function of ASTM U.S. Standard mesh designation.

The extended PSD product (Extended PSD-1) has a specific gravity of about 3.2 g/cc.

The test procedures and apparatus employed to test the permeability in millidarcies-foot (md-ft) of the pellets of the present invention is as described above.

Crush strength is determined as described above. The crush strength for the Extended PSD-1 product, determined at 7500 psi, is 1.3%. This compares with a crush strength of 0.8% for the conventional intermediate grade 20/40 product, tested under the same conditions, and is much superior to a conventional LWP.

Figure 2:
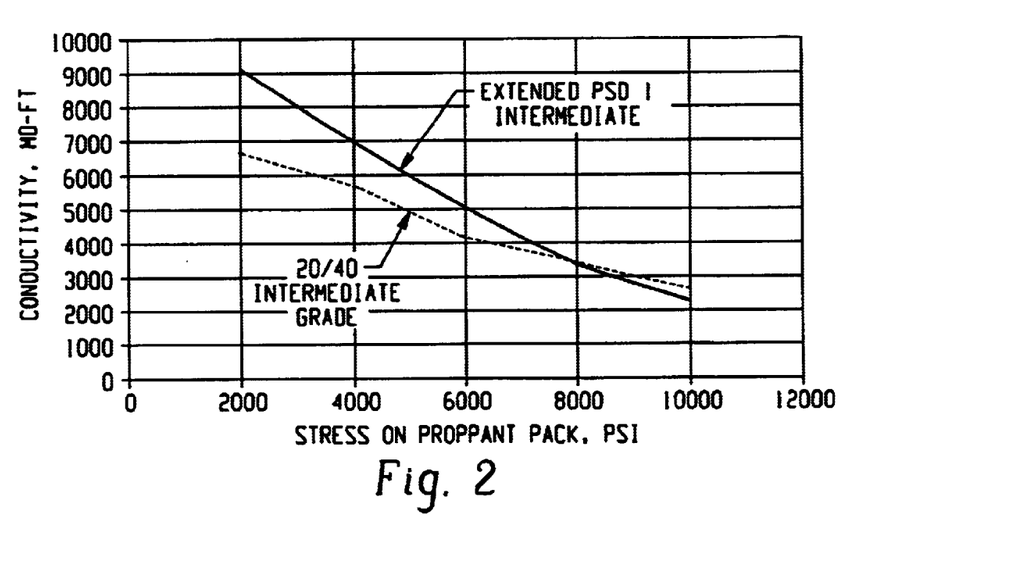
FIG. 2 is a plot of conductivity, in md-ft, as a function of stress on a proppant pack formed from the first Extended PSD proppant mixture.
Figure 3:
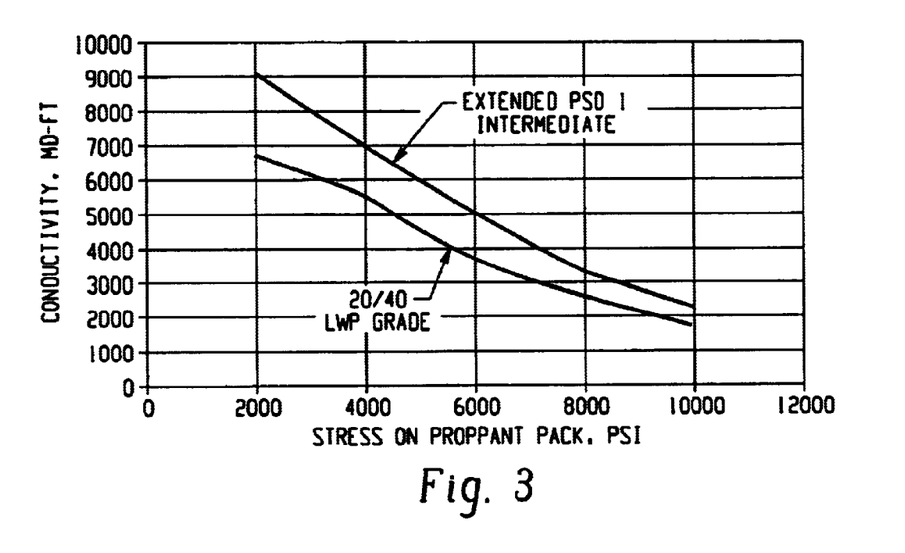
FIG. 3 is a plot of conductivity, in md-ft, as a function of stress on a proppant pack formed from the conventional 20/40 mixture of FIG. 1.

FIG. 2 shows the conductivity in md-ft of the proppant pack as a function of the pressure in psi applied to the proppant pack for the Extended PSD-1 product. These are compared with values for the conventional 20/40 intermediate grade, determined by the same method. FIG. 3 shows a similar comparison, but with a 20/40 LWP grade. As can be seen from FIGS. 2 and 3, the Extended PSD-1 functions better than the conventional LWP products over the entire range and better than the IP grade over the 2000 to 8000 psi range.

Example 2

A second intermediate grade proppant mixture (Extended PSD-2) is prepared as for Example 1 with the size distribution shown in TABLE 4. The equivalent particle diameter is shown. The nominal particle diameter is an average of the maximum and minimum values.

TABLE 4

| Sieve Mesh Size | Equivalent Particle Diameter (mm) | Nominal Particle Diameter (mm) | Weight % Retained | | |
|---|---|---|---|---|---|
| | | | Extended PSD-2 | Comp. Ex. A | Comp. Ex. B |
| 16 | >1.18 mm | ~1.6 | 0.5 | 0.0 | 0.0 |
| 18 | 1–1.18 mm | 1.09 | 5.4 | 0.0 | 0.0 |
| 20 | 0.85–1.0 mm | 0.93 | 27.1 | 3.7 | 5.0 |
| 25 | 0.71–0.85 mm | 0.78 | 26.1 | 28.6 | 33.0 |
| 30 | 0.6–0.71 mm | 0.66 | 20.9 | 31.4 | 35.0 |
| 35 | 0.50–0.60 mm | 0.55 | 13.5 | 34.3 | 20.0 |
| 40 | 0.425–0.5 mm | 0.46 | 6.0 | 2.0 | 6.0 |
| 45 | 0.355–0.425 | 0.39 | 0.4 | 0.0 | 0.0 |
| 50 | 0.30–0.355 | 0.33 | 0.0 | 0.0 | 0 |

The Extended PSD-2 product has a specific gravity of 3.2 g/cc and a median particle diameter of about 0.74 mm. Conductivity is generally significantly higher than in a conventional 20/40 LWP grade product, and comparable to an intermediate grade product.

Figure 4:
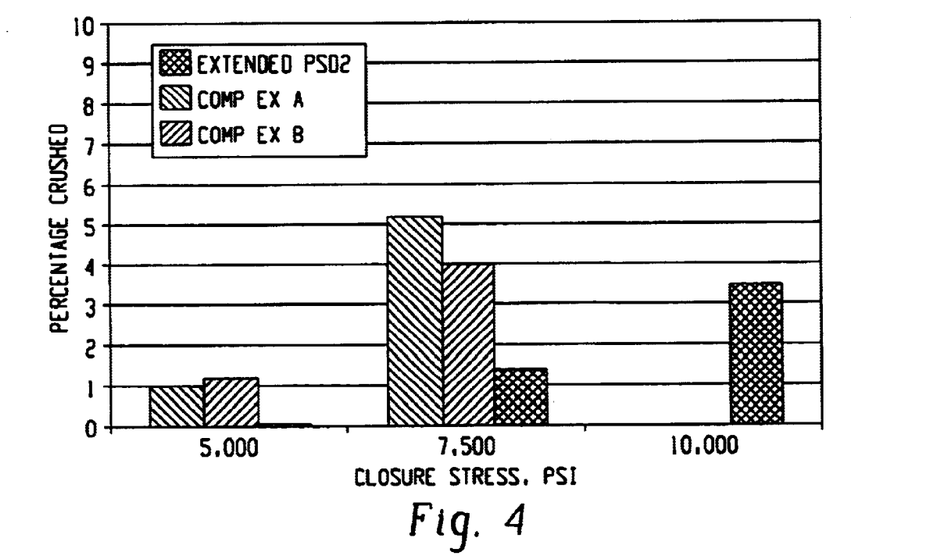
FIG. 4 is a plot of percentage of the proppant pack which is crushed when subjected to a closure stress, of 5000, 7500, or 10,000 psi for a second Extended PSD proppant mixture and at closure stresses of 5000 and 7500 psi for two conventional 20/40 mixtures.

FIG. 4 compares the percentage crushed at three different pressures for the Extended PSD-2 product and two commercial LWP 20/40 grade proppant mixtures labeled Comparative Example A (Comp. Ex. A) and Comparative Example B (Comp. Ex. B.) Comp. Ex. A has a median particle diameter of about 0.65 mm. Comp. Ex. B is an aluminosilicate ceramic proppant in which 67–69% is in the form of aluminum silicate (mullite) 0–30% is in the form of silica (crystobalite), 0–30% is in the form of amorphous silica (quartz), less than 2% is iron oxide, and less than 3% is titanium. It has a median particle diameter of about 0.67 mm.

Figure 5:
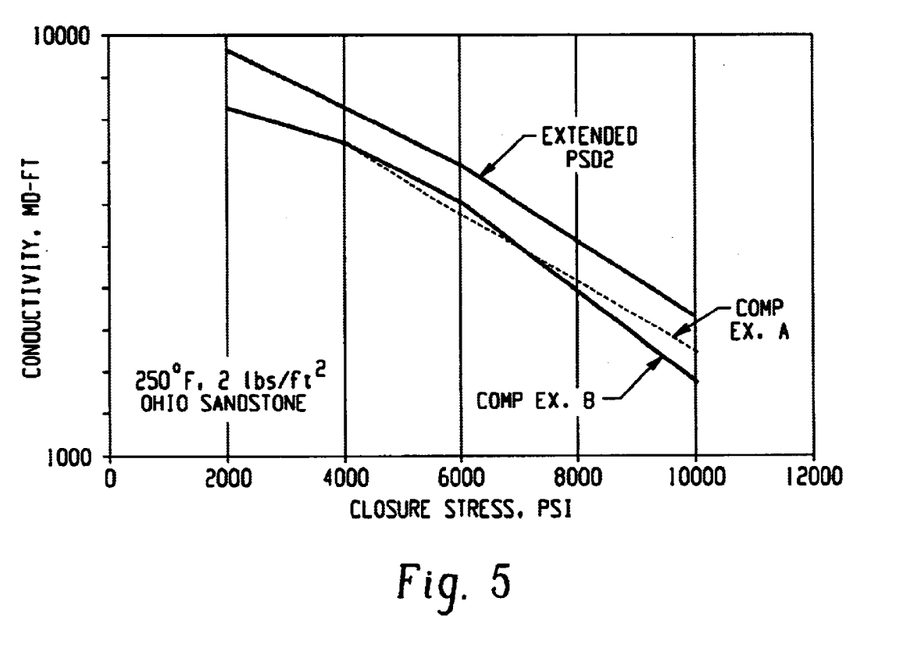
FIG. 5 is a plot of conductivity, in md-ft, as a function of stress on a proppant pack formed from the second Extended PSD proppant mixture and two conventional 20/40 mixtures of FIG. 4.

FIG. 5 shows the conductivities of packs formed from each of the three examples. As seen from FIGS. 4 and 5, the Extended PSD-2 product outperformed the two conventional LWP samples, while also providing a comparable cost product.

The invention has been described with reference to the preferred embodiment. Obviously, modifications and alterations will occur to others upon reading and understanding the receding detailed description. It is intended that the invention be construed as including all such modifications and alterations insofar as they come within the scope of the appended claims or the equivalents thereof.

Having thus described the preferred embodiments, the invention is now claimed to be:

1. A method of forming a proppant mixture comprising:
   combining a particulate material with a liquid to form a mixture;
   forming the mixture into spherical pellets;
   screening the pellets; and
   firing the pellets to provide a proppant mixture with a size distribution in which:
   0–25% wt. % of the pellets have a diameter of from 1.0–1.18 mm;
   20–38 wt. % of the pellets have a diameter of from 0.85–1.0 mm;
   20–38 wt. % of the pellets have a diameter of from 0.71–0.85 mm; and
   15–35 wt. % of the pellets have a diameter of from 0.60–0.71 mm.

2. The method of claim 1, wherein:
   about 3–10% wt. % of the pellets having a diameter of from 1 mm–1.18 mm;
   about 22–30% wt. % of the pellets have a diameter of from 0.85–1.0 mm;
   about 25–36 wt. % of the pellets have a diameter of from 0.71–0.85 mm;
   about 16–30 wt. % of the pellets have a diameter of from 0.60–0.71 mm.

3. The method of claim 1, wherein less than 25 wt. % of the pellets have a diameter of from 0.50–0.60 mm.

4. The method of claim 3, wherein 5–20 wt. % of the pellets have a diameter of from 0.50–0.60 mm.

5. The method of claim 1, wherein the fired pellets in the mixture have a median diameter of from about 0.6 mm to about 0.85 mm.

6. The method of claim 1, wherein at least 95% by weight of the fired pellets in the mixture have a diameter of from 0.425 mm to 1.18 mm.

7. The method of claim 6, wherein at least 98% by weight of the fired pellets in the mixture have a diameter of from 0.425 mm to 1.18 mm.

8. The method of claim 1, wherein the particulate material comprises at least one of silica and alumina.

9. The method of claim 1, wherein the step of screening is carried out at least in part prior to the step of firing.

10. The method of claim 1, wherein the particulate material has a mean particle diameter of less than 20 microns.

11. The method of claim 1, wherein less than 75% of the pellets in the mixture have a diameter in the range of 0.5–0.85 mm.

12. A method of forming a proppant mixture comprising:
   combining a particulate material with a liquid to form a mixture;
   forming the mixture into spherical pellets;
   screening the pellets; and
   firing the pellets to provide a proppant mixture comprising pellets having a median diameter of from about 0.6 to 0.85 mm and wherein when the proppant mixture is sieved through a plurality of sieves having mesh sizes of 18, 20, 25, 30, and 35:
   20–38 wt. % of the pellets are retained by the 20 mesh sieve;
   20–38 wt. % of the pellets are retained by the 25 mesh sieve; and
   15–35 wt. % of the pellets are retained by the 30 mesh sieve.

13. The method of claim 12, wherein 5–20 wt. % of the pellets are retained by the 35 mesh sieve.

14. The method of claim 12, wherein,
   22–30 wt. % of the pellets are retained by the 20 mesh sieve,
   25–36 wt. % of the pellets are retained by the 25 mesh sieve,
   16–30 wt. % of the pellets are retained by the 30 mesh sieve, and
   6–15 wt. % of the pellets are retained by the 35 mesh sieve.

15. The method of claim 12, wherein a total of less than 75 wt. % of the pellets is retained by the 25, 30, and 35 mesh sieves.

16. The method of claim 14, wherein no more than 10 wt. % of the pellets pass through the 35 mesh sieve.

17. The method of claim 12, wherein the pellets in the proppant mixture have a median diameter of from 0.70 to 0.78 mm.

18. A proppant mixture comprising:

ceramic pellets having a sphericity of at least 0.75, and wherein:

at least 3 wt. % of the pellets have a diameter of from 1 mm–1.18 mm;

at least 20 wt. % of the pellets have a diameter of from 0.85–1.0 mm;

less than 38 wt. % of the pellets have a diameter of from 0.71–0.85 mm; and at least 10 wt. % of the pellets have a diameter of from 0.60–0.71 mm.

19. The proppant mixture of claim 18, further including a gel, the pellets being intermixed with the gel.

20. The proppant mixture of claim 18, wherein the crush strength is less than 3% at 7500 psi.

21. A method of propping a geological formation, comprising:

combining spherical pellets with a liquid or gel to form a mixture and forcing the mixture under pressure into the geological formation until the pellets are situated in cracks in the formation, the spherical pellets having a size distribution in which:

at least 3 wt. % of the pellets have a diameter of from 1 mm–1.18 mm;

at least 20 wt. % of the pellets have a diameter of from 0.85–1.0 mm;

less than 38 wt. % of the pellets have a diameter of from 0.71–0.85 mm; and at least 10 wt. % of the pellets have a diameter of from 0.60–0.71 mm.

22. A proppant mixture comprising:

ceramic pellets having a median particle size, which when the proppant mixture is sieved through a sequential series of mesh sizes selected from the ASTM U.S. Standard mesh sizes consisting of 12, 14, 16, 18, 20, 25, 30, 35, 40, and 45, is in a peak mesh size corresponding to one of the meshes in the series, and wherein:

0–25% wt. % of the pellets are retained on the sieve having a mesh size which is two sizes preceding the peak mesh in the sequence;

20–38 wt. % of the pellets are retained on the sieve having a mesh size immediately preceding the peak mesh in the sequence;

20–38 wt. % of the pellets are retained on the peak mesh; and

15–35 wt. % of the pellets are retained on the next subsequent mesh in the sequence.

23. The proppant mixture of claim 22, wherein less than 75% of the pellets fall within the peak mesh size and the subsequent two mesh sizes in the sequence.

24. The proppant mixture of claim 22, wherein at least 95% of the pellets fall within the peak mesh size and the subsequent two mesh sizes in the sequence and the prior two mesh sizes in the sequence.

\* \* \* \* \*